(12) United States Patent
Taniguchi et al.

(10) Patent No.: US 9,994,429 B1
(45) Date of Patent: Jun. 12, 2018

(54) HANDRAIL WITH A BUILT-IN RBI (71) Applicant: Otis Elevator Company, Farmington, CT (US)

(72) Inventors: Naoki Taniguchi, Sakura (JP); Kenichi Ohmura, Yotsukaido (JP); Takahiro Yamada, Narita (JP); Keiji Hashimoto, Sakura (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days. days.

(21) Appl. No.: 15/594,887

(22) Filed: May 15, 2017

(51) Int. Cl.
*B65G 29/00* (2006.01)
*B66B 29/00* (2006.01)
*B66B 23/24* (2006.01)
*B65G 43/02* (2006.01)
*B66B 25/00* (2006.01)

(52) U.S. Cl.
CPC .............. *B66B 29/00* (2013.01); *B65G 43/02* (2013.01); *B66B 23/24* (2013.01); *B66B 25/006* (2013.01); *B65G 2203/0275* (2013.01); *B65G 2207/40* (2013.01); *B65G 2207/48* (2013.01)

(58) Field of Classification Search
CPC ....... B66B 23/24; B66B 25/006; B66B 29/00; B66B 31/02; B65G 43/02; B65G 2203/0275; B65G 2207/40; B65G 2207/48
USPC ..................................... 198/323, 337, 502.1
See application file for complete search history.

(56) References Cited

U.S. PATENT DOCUMENTS

| | | | | |
|---|---|---|---|---|
| 3,834,524 A | * | 9/1974 | Ratz | B65G 43/02 198/810.02 |
| 4,087,800 A | * | 5/1978 | Lee | B65G 43/02 198/810.02 |
| 5,708,416 A | | 1/1998 | Zaharia et al. | |
| 6,015,038 A | * | 1/2000 | Stoxen | B66B 23/24 198/322 |
| 6,112,166 A | | 8/2000 | Joosten | |
| 6,267,219 B1 | | 7/2001 | Spannhake et al. | |
| 6,715,602 B1 | * | 4/2004 | Gartland | B65G 43/02 198/502.1 |
| 7,178,663 B2 | * | 2/2007 | Schnell | B65G 43/02 198/810.02 |
| 7,740,128 B2 | * | 6/2010 | Wallace | B65G 43/02 198/618 |
| 7,810,634 B2 | * | 10/2010 | Wallace | B65G 15/36 198/810.02 |

(Continued)

FOREIGN PATENT DOCUMENTS

EP 0960847 A1 12/1999
JP H04148793 A 5/1992
(Continued)

*Primary Examiner* — Leslie A Nicholson, III
*Assistant Examiner* — Keith R Campbell
(74) *Attorney, Agent, or Firm* — Cantor Colburn LLP (57) ABSTRACT

A system for detecting a defect in a steel wire embedded in a handrail of a passenger conveyor includes a non-contact inspection device embedded in the handrail for inspecting a condition of the steel wire and transmitting a signal regarding the condition of the steel wire, a non-contact power supply device arranged in proximity to the handrail for supplying power wirelessly to the non-contact inspection device from the outside of the handrail, and a controller arranged outside of the handrail for receiving the signal regarding the condition wirelessly and determining whether there is a defect in the steel wire.

13 Claims, 11 Drawing Sheets

(56) References Cited

U.S. PATENT DOCUMENTS

| | | | |
|---|---|---|---|
| 8,074,789 B2 * | 12/2011 | May | B65G 43/02 198/502.1 |
| 8,205,735 B2 | 6/2012 | Behan et al. | |
| 8,312,987 B2 * | 11/2012 | Lynn | G01M 13/023 198/810.02 |
| 8,910,777 B2 * | 12/2014 | Minkin | B65G 43/02 198/810.02 |
| 8,997,973 B2 | 4/2015 | Depaso | |
| 9,016,465 B2 * | 4/2015 | Kuesel | B65G 15/00 198/810.02 |
| 9,024,198 B2 * | 5/2015 | Kajiya | H05K 1/028 174/254 |
| 9,199,800 B2 * | 12/2015 | Alport | B65G 43/02 |
| 9,221,610 B2 * | 12/2015 | Enshu | B65G 15/32 |
| 2004/0262132 A1 * | 12/2004 | Pauley | B65G 43/02 198/810.02 |
| 2008/0257692 A1 * | 10/2008 | Wallace | B65G 43/02 198/810.02 |

FOREIGN PATENT DOCUMENTS

| | | | |
|---|---|---|---|
| JP | 2609283 | B2 | 5/1997 |
| JP | 2009096581 | A | 5/2009 |
| JP | 2009196793 | A | 9/2009 |
| JP | 2011230874 | A | 11/2011 |
| JP | 2015229553 | A | 12/2015 |
| WO | 2012120144 | A2 | 9/2012 |
| WO | 2015160486 | A1 | 10/2015 |

* cited by examiner

HANDRAIL WITH A BUILT-IN RBI

The present invention relates generally to a device embedded in a handrail of a passenger conveyor. In particular, the present invention relates to a wireless device for detecting a defect in a handrail of a passenger conveyor.

BACKGROUND ART

In general, a passenger conveyor such as an escalator or a moving walkway has a handrail that passengers can grasp to provide passenger support when the conveyor is moving in a desired direction. The handrail is usually made up of a synthetic rubber, and steel wires are embedded in the handrail for reinforcing the synthetic rubber handrail.

When a passenger conveyor is used for a long period of time, a steel wire may break due to aged deterioration or metal fatigue, and the steel wire may protrude out from the surface of the rubber handrail. Leaving the steel wire protruding out from the handrail may cause serious injuries to passengers.

Therefore, there exists in the art a need for providing a system which ensures fracture detection of steel wires with less complicated structure.

SUMMARY OF INVENTION

According to one aspect of the present invention, a system for detecting a defect in at least one steel wire embedded in a handrail of a passenger conveyor is disclosed. The system includes a non-contact inspection device embedded in the handrail for inspecting a condition of the steel wire and transmitting a signal regarding the condition of the steel wire, a non-contact power supply device arranged in proximity to the handrail for supplying power wirelessly to the non-contact inspection device from the outside of the handrail, and a controller arranged outside of the handrail for receiving the signal regarding the condition wirelessly and determining whether there is a defect in the steel wire.

In some embodiments, the non-contact inspection device is configured to measure a resistance of each steel wire and transmit the resistance to the controller, and the controller is configured to detect a defect in the steel wires based on the resistance of each steel wire.

In some embodiments, the non-contact power supply device includes an array of wireless power transfer coils arranged along the moving direction of the handrail.

In some embodiments, the non-contact inspection device includes a flexible circuit board.

In some embodiments, the non-contact inspection device includes a non-contact power receiving unit for receiving electric power from the non-contact power supply device, a power storage unit for storing the electric power, a resistance measuring unit for measuring a resistance of each of the steel wires, and a wireless communication unit for transmitting the resistance to the controller.

According to another aspect of the present invention, a method of detecting a defect in at least one steel wire embedded in a handrail of a passenger conveyor is disclosed. The method includes supplying power wirelessly to a non-contact inspection device embedded in the handrail from the outside of the handrail, inspecting a condition of the steel wire within the handrail, transmitting a signal regarding the condition of the steel wire wirelessly to a controller arranged outside of the handrail, and receiving the signal regarding the condition and determining whether there is a defect in the steel wire.

In some embodiments, the signal regarding the condition of the steel wire is a resistance of each steel wire, and determining whether there is a defect in the steel wire includes comparing the resistance of each steel wire with a threshold value, and detecting the presence of a defect if the resistance of any of the steel wires exceeds the threshold value.

In some embodiments, the threshold value is determined based on the resistances of the steel wires measured in the initial state after installation of the passenger conveyor or after repair or replacement of the handrail.

In some embodiments, the threshold value is determined based on the resistances of the steel wires measured a predetermined number of times in the initial state.

In some embodiments, the method further includes transmitting a caution to a remote monitoring system to monitor conditions of the steel wires if the controller detects that a defect is found in the steel wires.

In some embodiments, the method further includes transmitting a warning to a remote monitoring system for an inspection if the controller detects that the resistance of any steel wire increases to infinity.

In some embodiments, the method further includes comparing the current resistances of the steel wires found to be defective with the previous resistances of those steel wires, identifying that the defect level increases if the current resistance of any of the defective steel wires increases from the previous resistance of the steel wire, and transmitting the current defect level of the defective steel wire to a remote monitoring unit.

In some embodiments, the signal regarding the condition of the steel wire is a sum total of resistances of the at least one steel wire, and determining whether there is a defect in the steel wire includes comparing the sum total of the resistances with a threshold value, and detecting the presence of a defect if the sum total of resistances exceeds the threshold value.

These and other aspects of this disclosure will become more readily apparent from the following description and the accompanying drawings, which can be briefly described as follows.

DESCRIPTION OF EMBODIMENTS

Figure 1:
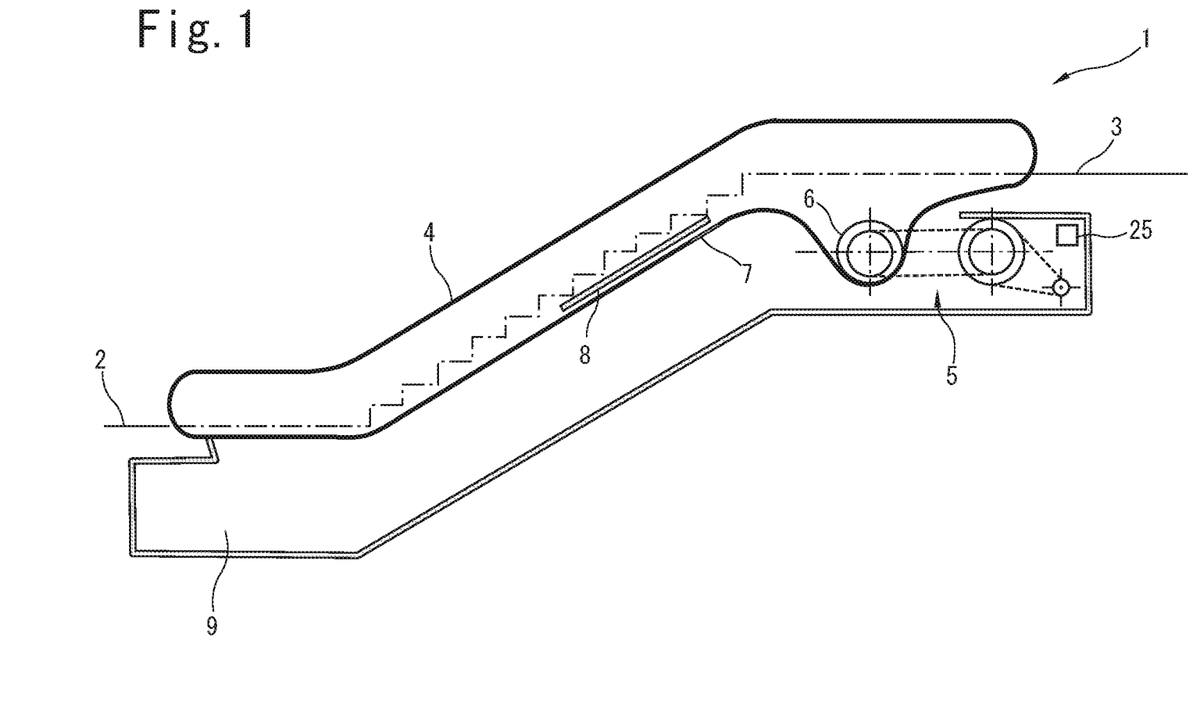
FIG. 1 is a schematic view of an escalator including the built-in resistance based inspection device and the non-contact power supply device in accordance with the present invention.

FIG. 1 schematically illustrates a side view of an escalator 1 for carrying passengers between landings 2 and 3 at different levels within a building. The escalator 1 includes a handrail 4 that travels along the escalator 1 to provide passenger support. The escalator 1 includes a controller 25 for controlling the operation of the escalator 1 and a driving mechanism 5 for propelling the handrail 4 in a desired direction. The driving mechanism 5 includes a pulley 6 that engages the handrail 4 to cause a desired movement of the handrail 4 about a loop. As shown in FIG. 1, the handrail 4 comprises a built-in resistance based inspection (RBI) device 7 in accordance with the present invention for detecting a fracture in steel wires within the handrail 4 which will be described in further detail below. In one embodiment, a non-contact power supply device 8 is arranged in proximity to the handrail 4 within an escalator truss 9 for supplying electric power to the RBI device 7 from the outside of the handrail 4.

Figure 2:
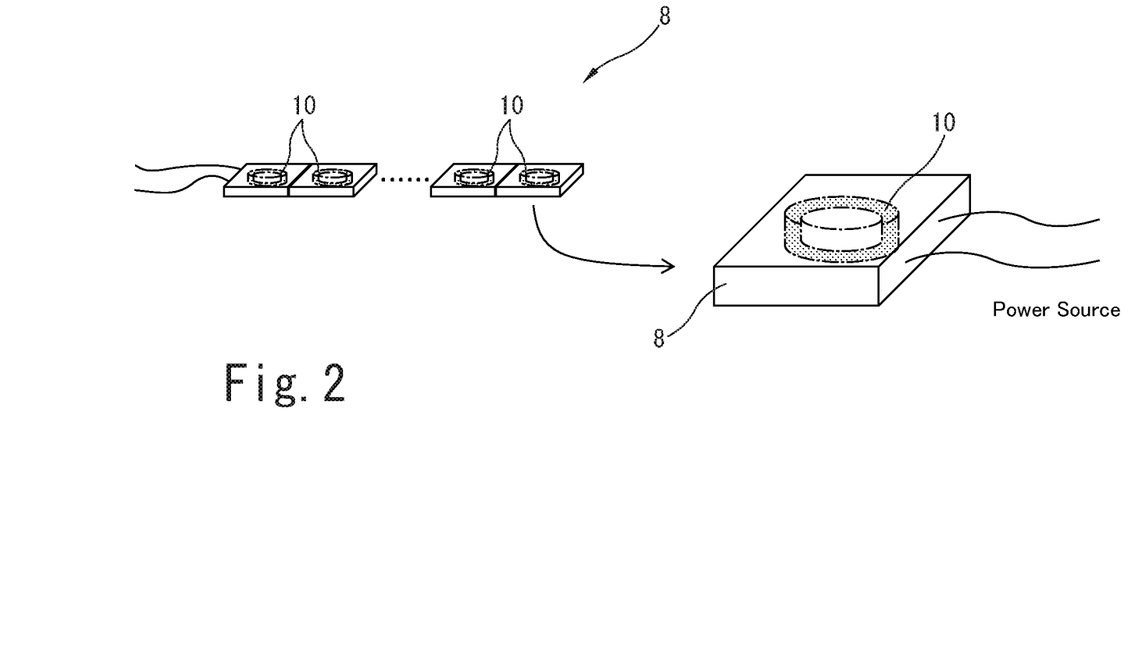
FIG. 2 is a schematic perspective view of an exemplary arrangement of the non-contact power supply device in accordance with the present invention.

FIG. 2 illustrates a diagrammatic perspective view of the non-contact power supply device 8 in accordance with the present invention. The non-contact power supply device 8 comprises an array of power transfer coils 10 arranged serially along the moving direction of the handrail 4 within the truss 9. As shown in FIG. 2, the non-contact power supply device 8 is connected to a power source within the escalator 1. It should be understood that the non-contact power supply device 8 can be arranged in any desired position within the escalator 1 provided that the non-contact power supply device 8 can properly supply electric power to the RBI device 7 in a non-contact manner.

Figure 3:
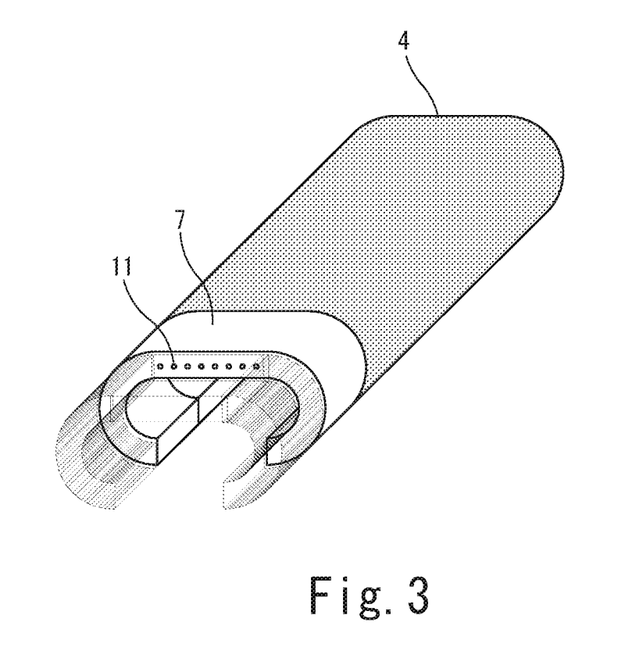
FIG. 3 illustrates a schematic perspective view of a handrail including the built-in resistance based inspection device in accordance with the present invention.

FIG. 3 illustrates a schematic perspective view of the built-in RBI device 7, in accordance with the present invention. In one embodiment, the built-in RBI device 7 is embedded in the handrail 4 having a C-shaped cross-section and electrically connected with a plurality of steel wires 11 arranged in parallel with each other and extending in a longitudinal direction of the handrail 4 for providing strength and rigidity to the handrail 4.

Figure 4A:
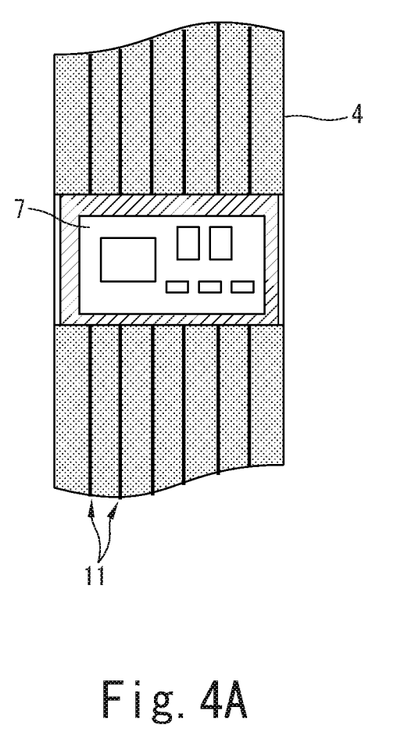
FIG. 4A illustrates a top view of a handrail and FIG. 4B illustrates a longitudinal cross-section of a handrail, including the built-in resistance based inspection device embedded in the handrail and electrically connected with steel wires.
Figure 4B:
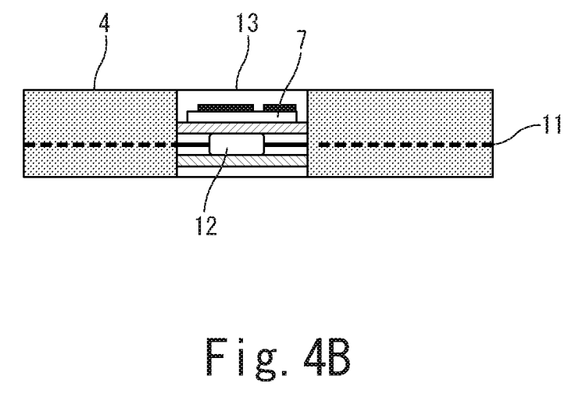

FIG. 4A is a top view of the handrail 4 and FIG. 4B is a longitudinal cross-section of the handrail 4, including the built-in RBI device 7 in accordance with the present invention. As shown in FIGS. 4A and 4B, the RBI device 7 is electrically connected to the steel wires 11 via their respective wire terminal holders 12 within the handrail 4 and coated with a polymer coating 13 in an integral manner with the outer surface of the handrail 4. Preferably, the RBI device 7 comprises a flexible circuit board so as to provide sufficient flexibility to bend around various pulleys 6 in the driving mechanism 5. However, any circuit board may be used in place of the flexible circuit board. It should also be understood that the polymer coating 13 may have the same composition as the outer jacket of the handrail 4 such as a synthetic rubber, or may have any desirable composition.

Figure 5:
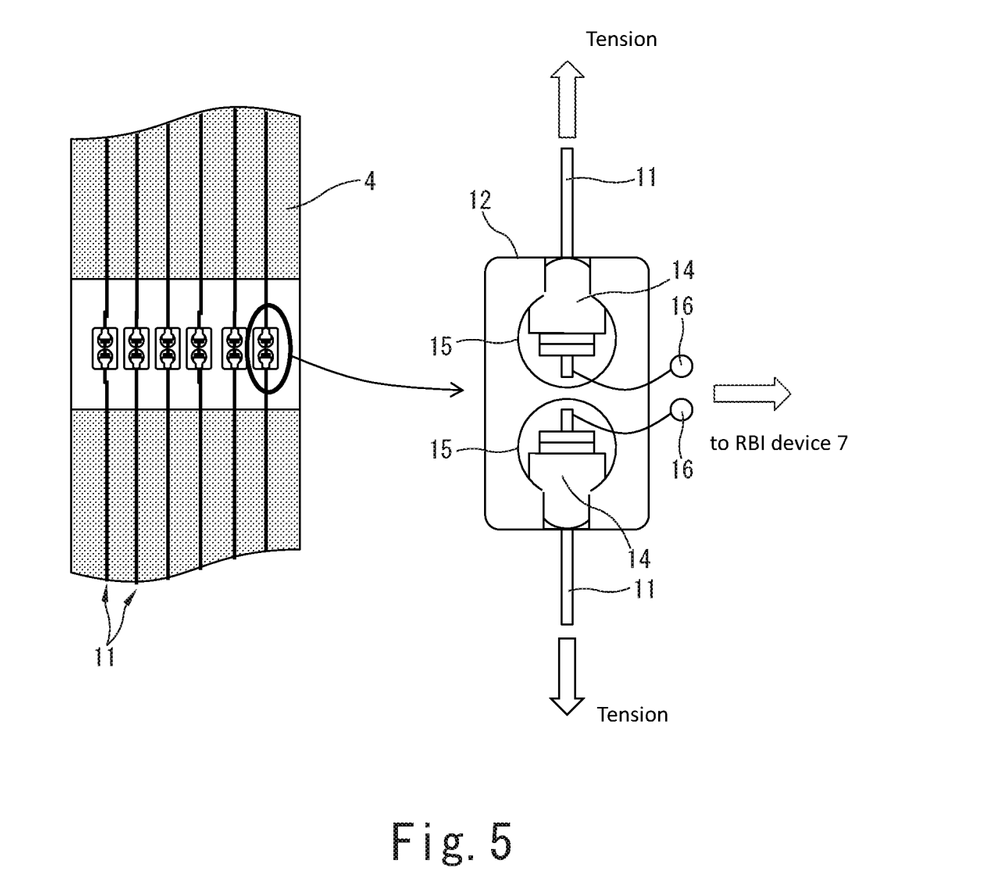
FIG. 5 is a schematic view showing one possible arrangement of an electrical connection between steel wires and the built-in resistance based inspection device in accordance with the present invention.

FIG. 5 schematically shows an example of electrical connection between each steel wire 11 and the RBI device 7 in accordance with the present invention. A plurality of steel wires 11 are arranged in parallel with each other and encased in the polymer jacket of the handrail 4. As shown in FIG. 5, each steel wire 11 is joined together at both ends by means of a wire terminal holder 12 to form a loop. The wire terminal holder 12 is formed by any appropriate insulation material, such as ceramics, and configured to electrically isolate both ends of the steel wire 11 in a loop.

In one example, each end of the steel wire 11 is provided with an electric insulating anchor 14 that is also formed by an insulation material, such as ceramics. The wire terminal holder 12 includes a pair of recesses 15 separated from each other and having a shape corresponding to the shape of the anchor 14 such that a pair of electric insulating anchors 14 at both ends of the steel wire 11 are inserted into their respective recesses 15 to provide electric insulating joint between both ends of the steel wire 11 when forming a loop. It should be understood that any configuration may be applied to the wire terminal holder 12 provided that it is configured to electrically isolate both ends of the steel wire 11 while providing a sufficient tension to the steel wire 11. Additionally, the electric insulating anchor 14 may comprise any type of adjusting clamp for adjusting tension of the steel wire.

Furthermore, each end of the steel wire 11 is connected to a corresponding electrical contact 16 of the RBI device 7. As will be described later, each steel wire 11 is configured to be electrically connected at both ends of the wire 11 only via the RBI device 7 for measuring a resistance of the steel wire 11.

Figure 6:
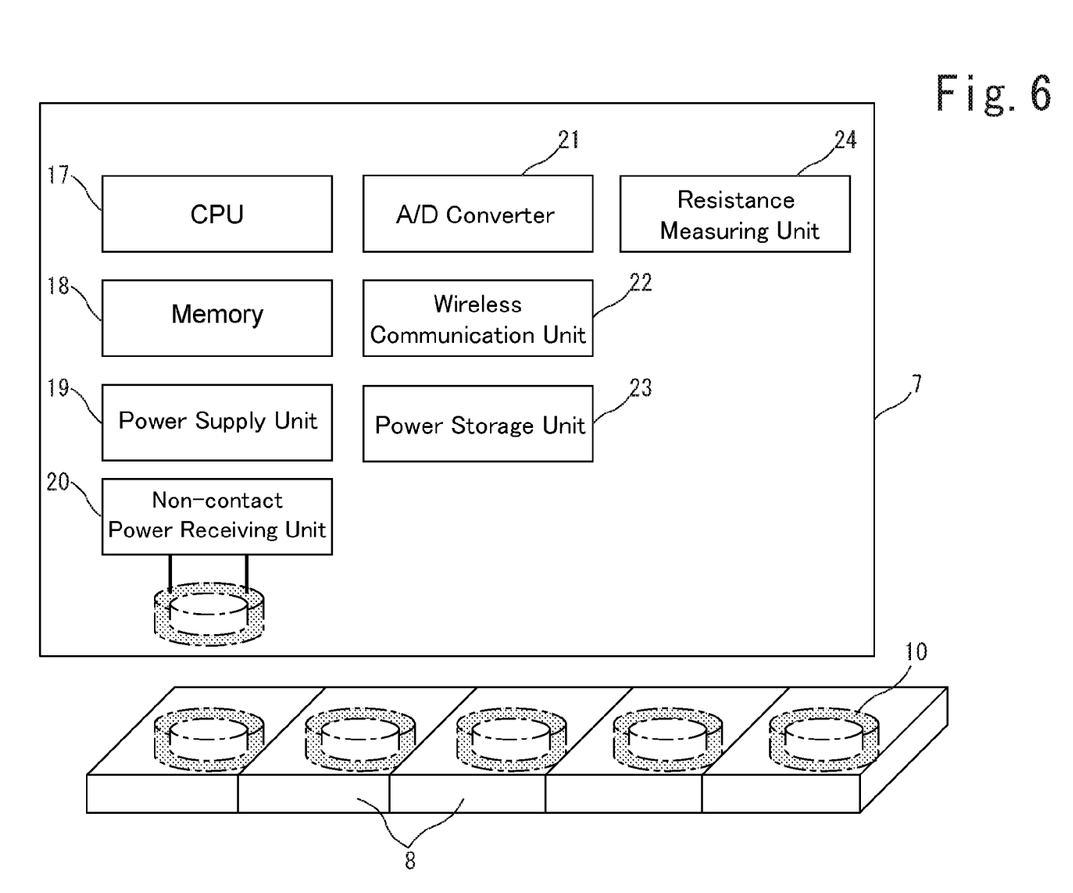
FIG. 6 illustrates a block diagram showing one possible arrangement of components in the built-in resistance based inspection device in accordance with the present invention.

FIG. 6 is a block diagram showing a configuration of the RBI device 7 according to an embodiment of the present invention. The RBI device 7 includes a CPU 17 for performing computation in accordance with a resistance measurement algorithm of the present invention as will be described later with reference to FIG. 7, a memory 18 for storing data that is used for performing computation, a power supply unit 19 for the operation of the RBI device 7, non-contact power receiving unit 20 configured to receive power from the non-contact power supply device 8, an A/D converter 21 for converting an analog value into a digital value, a wireless communication unit 22 for transmitting/receiving data to/from the controller 25 in the escalator 1, a power storage unit 23 (e.g. a capacitor) for storing an electric energy from the non-contact power supply device 8, and a resistance measuring unit 24 for measuring a resistance value of the electrical current flowing through each of the steel wires 11. In a preferred embodiment, each unit 17-24 is mounted on a flexible circuit board.

During operation of the escalator 1, when the RBI device 7 embedded in the handrail 4 passes over the non-contact power supply device 8 as shown in FIG. 1, the electric power is supplied from the non-contact power supply device 8 to the non-contact power receiving unit 20 and the RBI device 7 (power supply unit 19) is activated. When the RBI device 7 is activated, the CPU 17 initiates resistance measurement algorithm, and the resistance measuring unit 24 passes a weak current through each of the steel wires 11 embedded in the handrail 4 to measure resistance values of the respective steel wires 11. The resistance values measured by the resistance measuring unit 24 are immediately transmitted to the controller 25 of the escalator 1 through the wireless communication unit 22. The wireless communication unit 22 may include any appropriate communication means such as Wi-Fi, infrared communication, Bluetooth, etc.

As will be described in detail below with reference to FIG. 8, the controller 25 of the escalator 1 then determines whether the resistance value of each steel wire 11 measured by the RBI device 7 is normal or not. If the steel wire is damaged or fractured due to corrosion, metal fatigue or the like, the resistance of the current flowing through the steel wire 11 increases as the cross sectional area of the steel wire 11 decreases. By measuring the resistance of the current flowing through each of the steel wires 11, a defect in a steel wire can be detected in advance of the event that the steel wire protrudes out from the outer surface of the handrail or the steel wire completely breaks. Particularly, when the steel wire 11 completely breaks within the handrail, the resistance value becomes infinite and, hence, the built-in RBI device 7 can easily detect a defect condition in the steel wires 11 within the handrail 4 with less complicate structure.

In accordance with the present invention, the built-in RBI device 7 can detect in advance the risk of a steel wire protruding out from the outer surface of the handrail 4 due to breakage of the steel wire 11 embedded in the handrail 4, thereby preventing possible injury due to the projection of a steel wire 11.

Figure 7:
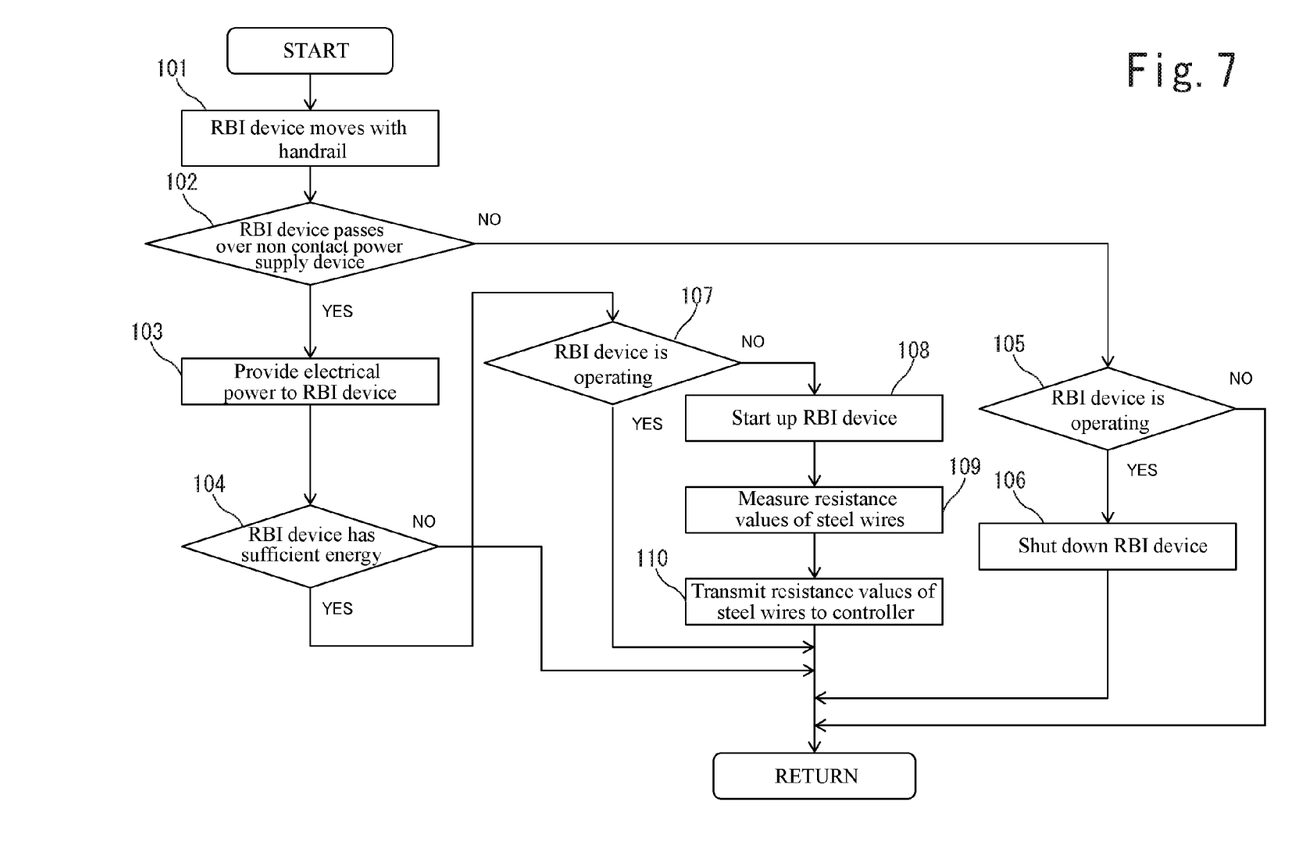
FIG. 7 is a flow diagram of an exemplary resistance measurement process performed by the built-in RBI device in accordance with the present invention.

FIG. 7 is a flowchart of an exemplary resistance measurement process performed by the built-in RBI device 7 in accordance with the present invention. The flow begins at step 101 where the RBI device 7 moves along the loop of the handrail 4. The flow then proceeds to step 102 where it determines if the RBI device 7 passes over the non-contact power supply device 8. If the RBI device 7 does not pass over the non-contact power supply device 8, then the flow proceeds to step 105 where it determines if the RBI device 7 is operating. If the RBI device 7 is operating, then the algorithm shuts down the RBI device 7 at step 106 and returns to step 101 to repeat process. If not, the flow returns to step 101 to repeat process.

At step 102, if the RBI device passes over the non-contact power supply device 8, the flow proceeds to step 103 where the electric power is supplied from the non-contact power supply device 8 to the RBI device 7, followed by proceeding to step 104 where it determines if the RBI device 7 has a sufficient energy for the operation of the resistance measurement of each steel wire 11. If not, the flow proceeds to step 101 to repeat process, i.e., to recharge the RBI device 7. If the RBI device 7 has enough energy for the resistance measurement at step 104, the flow proceeds to step 107 where it determines if the RBI device 7 is operating. If the RBI device has already been operating, i.e., the resistance has already been measured in the previous sequence, the flow proceeds to step 101 to restart process. If not, the flow proceeds to step 108 to initiate operation of the RBI device 7. Subsequently, the RBI device 7 measures a resistance value of each steel wire 11 by passing a weak current through each of the steel wires 11 at step 109. At step 110, the measured resistance value of each steel wire 11 is transmitted wirelessly to the main controller 25 of the escalator 1 for further process shown in FIG. 8. Following the execution of step 110, the algorithm returns to step 101 to repeat process.

Figure 8:
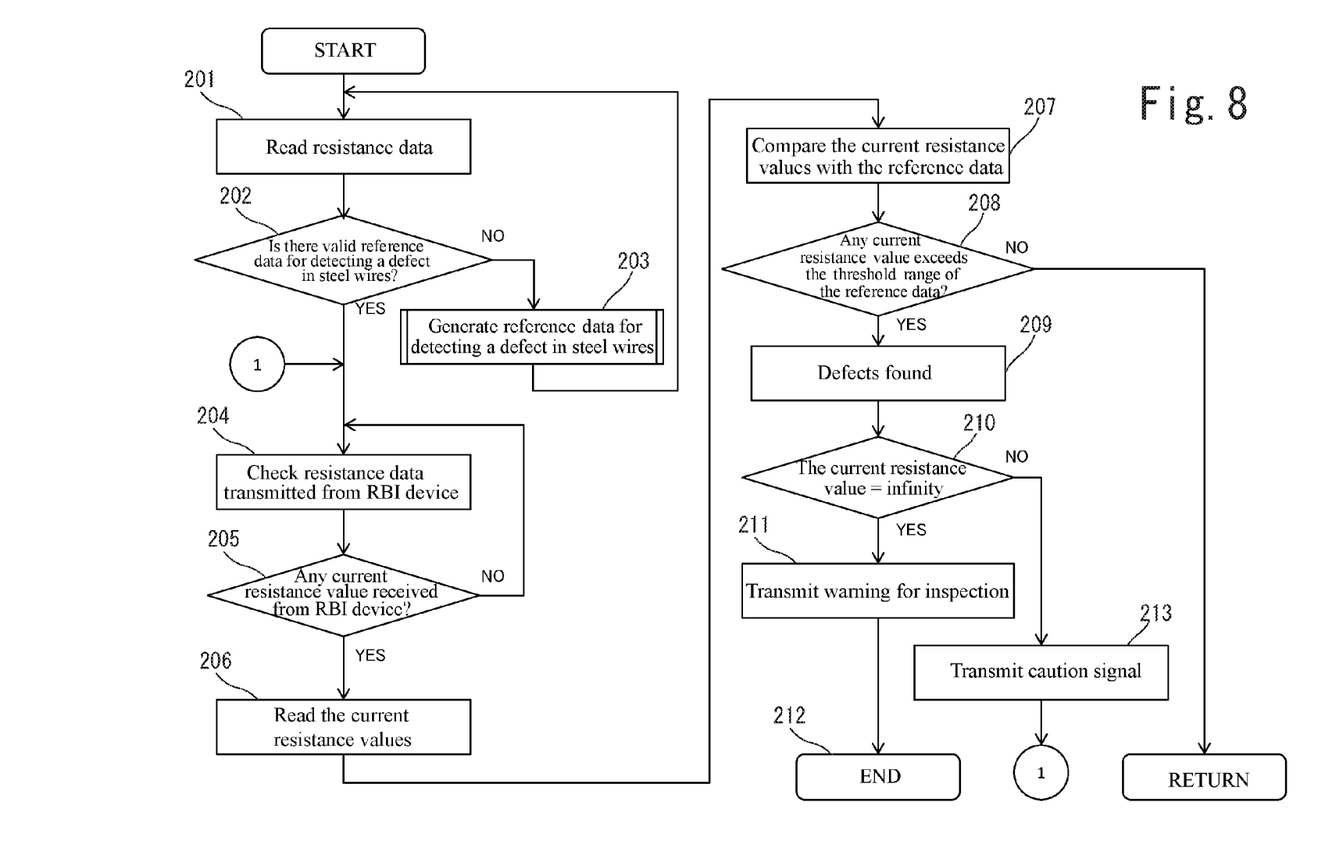
FIG. 8 is a flow diagram of exemplary operations performed by a controller of a passenger conveyor.

FIG. 8 is a flowchart of exemplary operations performed by the controller 25 of the escalator 1. The process begins at step 201 where the controller 25 reads resistance data transmitted from the RBI device 7 that are usually stored in a memory of the controller 25. Subsequently, the controller 25 determines if there is valid reference data for detecting a defect in the steel wires 11 at step 202, i.e., determining if there exist a number of resistance values sufficient to generate reference data of the steel wires 11 in normal state. The generated reference data in normal state is used for the comparison of the current resistance values transmitted from the RBI device 7. If there is no valid reference data for detecting a defect in the steel wires 11, the flow proceeds to step 203 where reference data of the steel wires 11 in normal state, i.e., in an initial state is generated.

Figure 9:
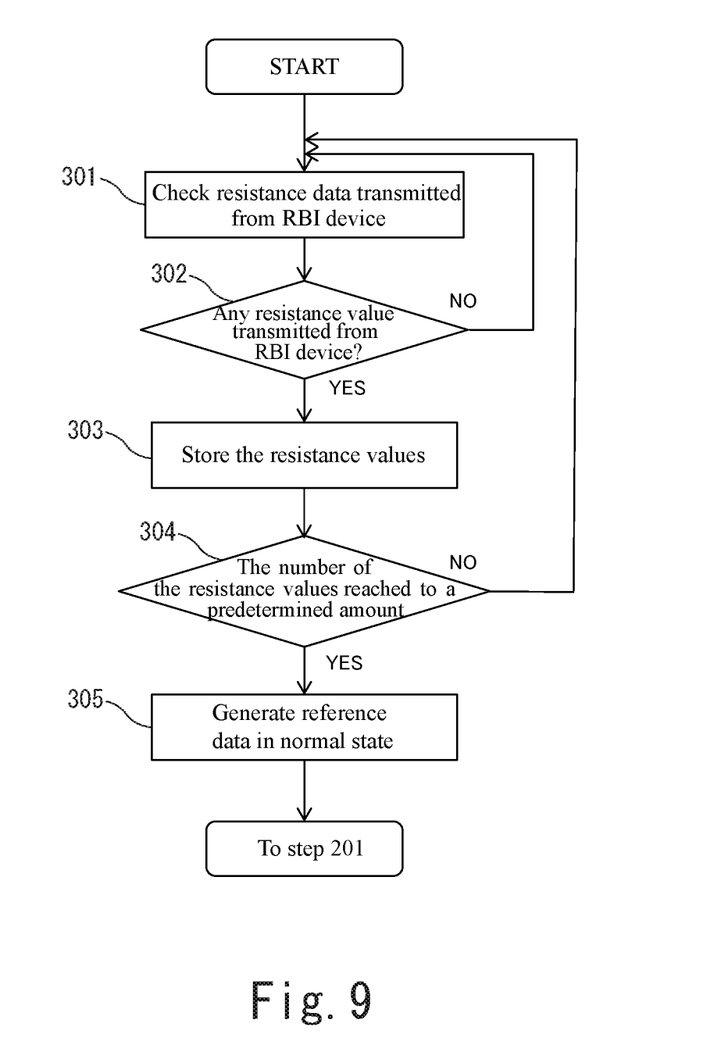
FIG. 9 is a flow diagram of an exemplary process of generating a reference data of steel wires in a normal state.

Here, FIG. 9 illustrates the details of step 203 from FIG. 8, which may be carried out several times during operation after installation of the escalator 1 or when the reference data stored in the memory is reset after repair, replacement of the handrail 4, etc. This step is carried out in order to collect sufficient number of initial resistance values of each steel wire 11 and generate reference data of the steel wires 11 in normal state based on the collected resistance values of the steel wires 11 in an initial state.

The process begins at step 301 where the controller 25 checks to see if it receives resistance values from the RBI device 7. If there is no resistance value received from the RBI device 7 at step 302, the algorithm returns to step 301 to repeat process until the controller 25 receives resistance data. At step 302, if the controller 25 receives resistance values from the RBI device 7, the controller 25 stores the resistance values in the memory at step 303 and then proceeds to step 304. At step 304, if the amount of data stored in the memory has reached a predetermined amount, the controller 25 generates reference data of the steel wires 11 in normal state at step 305. The reference data in normal state may include, for example, an average value of all the collected resistance values of the steel wires 11 in an initial state, a standard deviation of the collected resistance values in an initial state, etc. If the amount of data has not reached a predetermined amount at step 304, then the algorithm returns to step 301 to repeat process. Following the execution of step 305, the algorithm returns to step 201 in FIG. 8.

Again referring to FIG. 8, at step 202, if there is valid reference data for detecting a defect in the steel wires 11, the process then proceeds to step 204 where the controller 25 checks to see if it receives current resistance values from the RBI device 7. If there is no resistance value received from the RBI device 7 at step 205, the algorithm returns to step 204 to repeat process until the controller 25 receives current resistance data. At step 205, if the controller 25 receives current resistance values of the steel wires 11 from the RBI device 7, the controller 25 reads the current resistance values at step 206.

At step 207, the current resistance values of the steel wires 11 are compared with the reference data in normal state. At step 208, if the current resistance value of each steel wire 11 is within a threshold range of the reference data, then the current resistance value of each steel wire 11 is determined to be in a normal condition. In other words, the controller 25 determines that no defects are found in the steel wires 11. The threshold range may be determined at step 203 based on the reference data in normal state including, but not limited to, an average value of all the collected resistance values of the steel wires 11 in an initial state and a standard deviation of the collected resistance values in an initial state. Alternatively, the threshold range may be preset at the installation of the escalator 1 regardless of the reference data in normal state. Following the execution of step 208, the algorithm returns to step 201 to repeat process.

If the current resistance values of any steel wires 11 exceed the threshold range at step 208, then the controller 25 determines a defect has found in any one of the steel wires 11 at step 209. The defect may include any type of fracture that resulted from corrosion, metal fatigue, etc. as well as the complete break of a steel wire 11.

Subsequently, the controller 25 determines if the current resistance value is increased to infinity at step 210. If any one of the steel wires 11 has infinite resistance, the controller 25 determines that any one of the steel wires 11 has completely broken within the handrail 4 and the controller 25 immediately transmits a warning to a remote monitoring system for an inspection. Following the execution of step 211, the process completes at step 212.

On the other hand, if none of the steel wires 11 has infinite resistance at step 210, the controller 25 determines a fracture has found in any one of the steel wires 11 and the controller 25 transmits a caution signal to a remote monitoring system (step 213) for urging a maintenance person to monitor conditions of the defective steel wires 11. The algorithm then returns to step 204 to repeat process.

The measurement results at steps 211 and 213 are stored in the memory in the controller 25 of the escalator 1 so that a maintenance person can obtain the necessary data directly from the escalator 1 during inspection, using a computer either by wired or wireless connection. It should be understood that warning/caution signals may be transmitted to a maintenance person or a remote monitoring system of an escalator management company via any means known in the prior art regardless of whether it is wired or wireless connection.

Although the present invention has been described with reference to an embodiment in which the measured resistance value of each steel wire 11 is transmitted to the controller 25 independently at step 110, the measured resistance values of the steel wires 11 may be transmitted to the controller 25 as one sum signal. In such embodiment, the sum signal is transmitted to the controller 25 and then the sum total of the resistance values may be compared with a preset threshold value at step 208.

Figure 10:
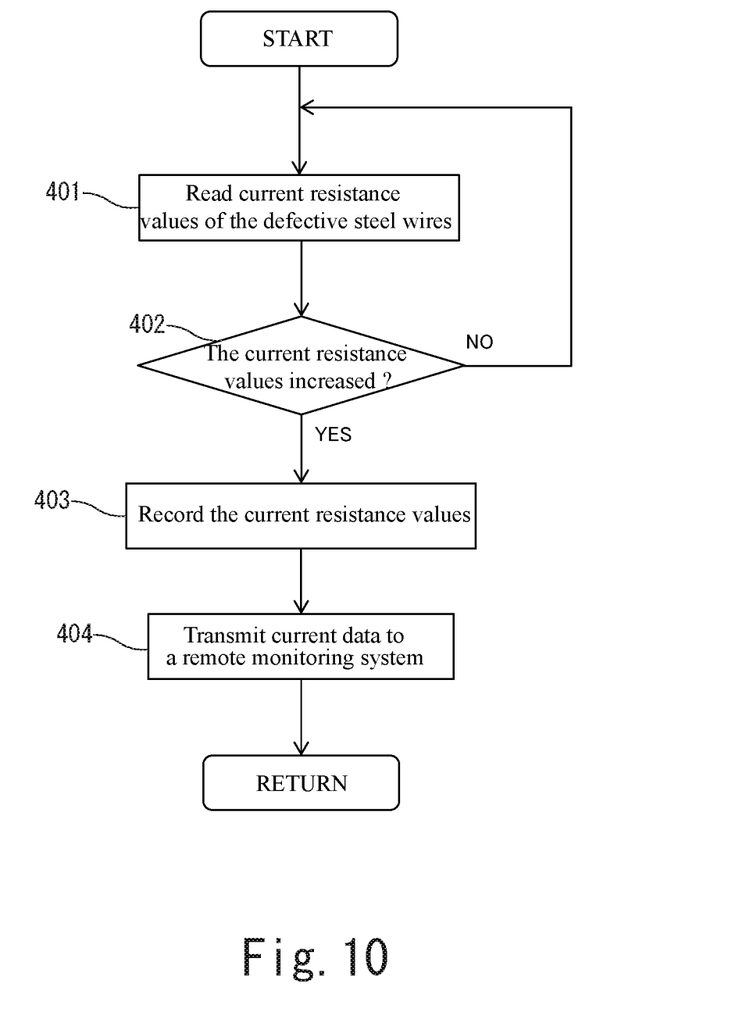
FIG. 10 is a flow diagram of an exemplary process of monitoring defect level of defective steel wires.

Additionally or alternatively, the controller 25 may further include monitoring resistance changes of the defective steel wires 11. FIG. 10 illustrates a flowchart of exemplary operations performed by the controller 25 in the escalator 1 where the current status of the steel wires 11 with fractures found at step 213 are compared with the previous status of those steel wires 11. The process begins at step 401 where the controller 25 reads the current resistance values of the defective steel wires 11. At step 402, the controller 25 compares the current resistance values of the defective steel wires 11 with the previous resistance values of those steel wires 11. If the current resistance values are not changed from the previous resistance values, then the algorithm returns to step 401 to repeat process.

On the other hand, if the controller 25 detects that the current resistance value of any defective steel wire 11 has increased from the previous current resistance value at step 402, the controller 25 determines that the fracture in the defective steel wire 11 has increased. The controller 25 records the current status of the defective steel wire 11 in the memory at step 403. Subsequently, the controller 25 transmits the current status of the defective steel wire 11 to a remote monitoring system at step 404 to further monitor the fracture level in the defective steel wire 11. The algorithm then returns to step 401 to repeat process.

According to the present invention, even a minor defect in a steel wire can be easily detected with less complicate structure, in advance of the event that the steel wire protrudes out from the outer surface of the handrail or the steel wire completely breaks. This is achieved by measuring resistance of the current flowing through each of the steel wires 11 using a wireless built-in resistance based inspection (RBI) device of the present invention.

Although the present invention is described with referenced to the escalator 11, it will be appreciated that the RBI device of the present invention may be applied to any system that has a steel wire embedded in a polymer jacket, such as a moving walkway, etc.

While the present invention has been particularly shown and described with reference to the exemplary embodiments as illustrated in the drawings, it will be recognized by those skilled in the art that various modifications may be made without departing from the spirit and scope of the invention as disclosed in the accompanying claims.

What is claimed is:

1. A system for detecting a defect in at least one wire embedded in a handrail of a passenger conveyor, comprising:
    a non-contact inspection device embedded in the handrail for inspecting a condition of the wire and transmitting a signal regarding the condition of the wire;
    a non-contact power supply device arranged in proximity to the handrail for supplying power wirelessly to the non-contact inspection device from the outside of the handrail; and
    a controller arranged outside of the handrail for receiving the signal regarding the condition wirelessly and determining whether there is a defect in the wire;
    wherein the non-contact inspection device is configured to measure a resistance of each wire and transmit the resistance to the controller, and the controller is configured to detect a defect in the wires based on the resistance of each wire.

2. The system of claim 1, wherein the non-contact power supply device includes an array of wireless power transfer coils arranged along the moving direction of the handrail.

3. The system of claim 1, wherein the non-contact inspection device includes a flexible circuit board.

4. The system of claim 1, wherein the non-contact inspection device includes a non-contact power receiving unit for receiving electric power from the non-contact power supply device, a power storage unit for storing the electric power, a resistance measuring unit for measuring a resistance of each of the wires, and a wireless communication unit for transmitting the resistance to the controller.

5. The system of claim 1, wherein the wire comprises a wire.

6. A method of detecting a defect in at least one wire embedded in a handrail of a passenger conveyor, the method comprising:
    supplying power wirelessly to a non-contact inspection device embedded in the handrail from the outside of the handrail;
    inspecting a condition of the wire within the handrail;
    transmitting a signal regarding the condition of the wire wirelessly to a controller arranged outside of the handrail; and
    receiving the signal regarding the condition and determining whether there is a defect in the wire;
    wherein the signal regarding the condition of the wire is a resistance of each wire, and determining whether there is a defect in the wire comprises:
    comparing the resistance of each wire with a threshold value; and
    detecting the presence of a defect if the resistance of any of the wires exceeds the threshold value.

7. The method of claim 6, wherein the threshold value is determined based on the resistances of the wires measured in the initial state after installation of the passenger conveyor or after repair or replacement of the handrail.

8. The method of claim 7, wherein the threshold value is determined based on the resistances of the wires measured a predetermined number of times in the initial state.

9. The method of claim 6, further comprising:
transmitting a caution to a remote monitoring system to monitor conditions of the wires if the controller detects that a defect is found in the wires.

10. The method of claim 6, further comprising:
transmitting a warning to a remote monitoring system for an inspection if the controller detects that the resistance of any wire increases to infinity.

11. The method of claim 6, further comprising:
comparing the current resistances of the wires found to be defective with the previous resistances of those wires;
identifying that the defect level increases if the current resistance of any of the defective wires increases from the previous resistance of the wire; and
transmitting the current defect level of the defective wire to a remote monitoring unit.

12. The method of claim 6, wherein the signal regarding the condition of the wire is a sum total of resistances of the at least one wire, and determining whether there is a defect in the wire comprises:
comparing the sum total of the resistances with a threshold value; and
detecting the presence of a defect if the sum total of resistances exceeds the threshold value.

13. The method of claim 6, wherein the wire comprises a wire.

* * * * *